Sept. 3, 1940.  R. S. HOPKINS  2,213,734

PHOTOGRAPHIC COPYING APPARATUS

Filed May 18, 1938  2 Sheets-Sheet 1

Roy S. Hopkins
INVENTOR

BY George A. Gillette Jr.
ATTORNEYS

Sept. 3, 1940.    R. S. HOPKINS    2,213,734
PHOTOGRAPHIC COPYING APPARATUS
Filed May 18, 1939    2 Sheets-Sheet 2
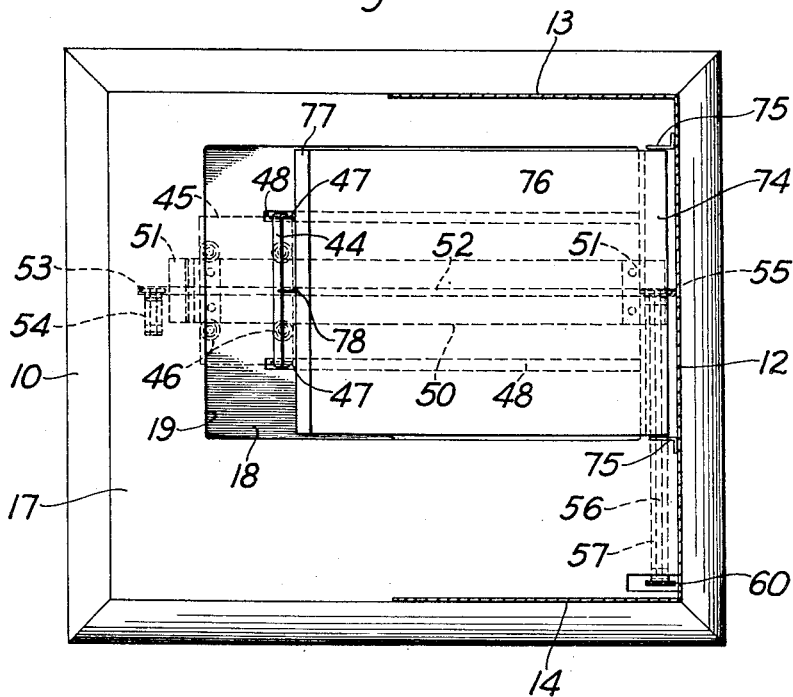
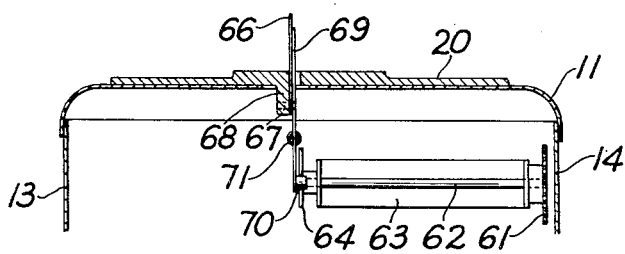
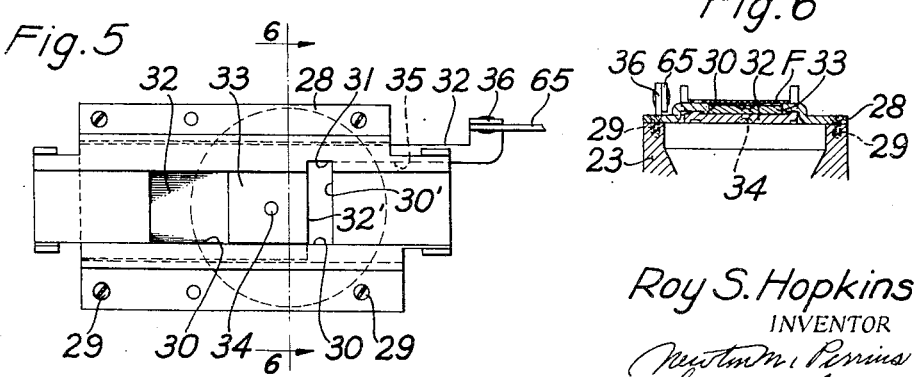
Roy S. Hopkins
INVENTOR Patented Sept. 3, 1940

2,213,734

UNITED STATES PATENT OFFICE 2,213,734

PHOTOGRAPHIC COPYING APPARATUS

Roy S. Hopkins, Rochester, N. Y., assignor to Eastman Kodak Company, Rochester, N. Y., a corporation of New Jersey Application May 18, 1938, Serial No. 208,605

10 Claims. (Cl. 88—24)

The present invention relates to a photographic copying apparatus and more particularly to a copying apparatus in which documents of various sizes are to be copied with the utmost economy and convenience.

In a photographic copying apparatus the exposure field must be sufficient to cover the largest document to be placed in the apparatus. If smaller documents are being copied, it is obviously not necessary to utilize the entire area of the exposure field and in fact considerable film is wasted unless there is some arrangement to reduce the area of the exposure field for smaller documents.

The primary object of the present invention is the provision of an indicating means associated with the copy holder of a photographic copying apparatus and operatively connected to a masking member of the copying camera so that the exposure field of the camera is varied according to a defined area on the copy holder on which the document is placed for copying.

Another object of the invention is the provision of a proportional and/or adjustable connection between such indicating member on a copy holder and a film masking member in the copying camera.

A further object of the invention is the provision of a covering means connected between the casing of the copying apparatus and the indicating member on the copy holder so that the operator cannot by mistake place the document in an area not covered by the exposure field of the copying camera.

Still another object of the invention is the arrangement of an abutment on the copy holder and of a fixed edge for the exposure field in the copying camera so that one edge of the document to be copied is always placed against such stationary abutment and variation of the exposure field is accomplished by movement of the masking member with respect to said fixed edge of the exposure field.

Other and further objects of the invention will be suggested to those skilled in the art by the description which follows.

The above and other objects of the invention are embodied in a photographic copying apparatus having a photographic field and an exposure position, comprising in combination, a copy holder for supporting a document in the photographic field, a film gate for supporting light-sensitive material in the exposure position and including an opening and a masking member movable to vary the area of said opening, and an indicating means associated with said copy holder for defining an area thereon and operatively connected to said masking member to vary the opening in said film gate in relation to the defined area on the copy holder. More specifically, the motion transmitting means between the indicating member and the masking member of the film gate may include a proportional connection for transmitting only a portion of the movement of the indicating member to the masking member and may include an adjustable connection for permitting relative adjustment of the masking member with respect to the indicating member. Finally, in order to obviate mistakes by the operator, a covering means in the form of a curtain roller may be mounted on the casing with its free end attached to the indicating member so that the area of the copy holder not covered at the time by the exposure field is not accessible for reception of a document to be copied.

Reference is hereby made to the accompanying drawings wherein like reference characters designate similar elements and wherein:

Fig. 3 is a plan view of the copy holder including the indicating means and covering means of the invention.

Fig. 4 is a fragmentary transverse vertical section taken on the line 4—4 of Fig. 1.

Fig. 5 is a fragmentary plan view to enlarged scale of the film gate and masking member; and Fig. 6 is a transverse cross section through the film gate taken on the line 6—6 of Fig. 5.

Figure 1:
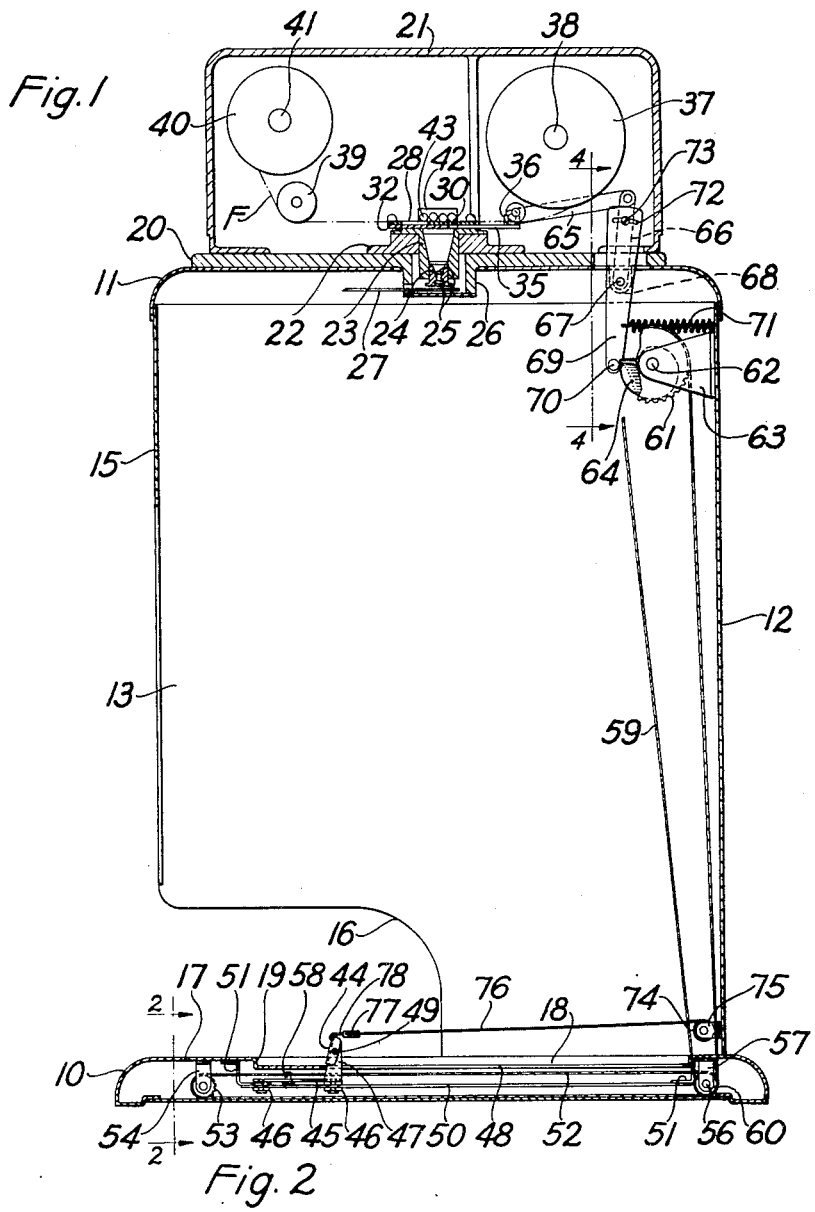
Fig. 1 is a vertical longitudinal section through the photographic copying apparatus of the invention.
Figure 2:
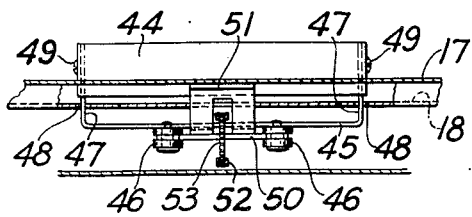
Fig. 2 is a fragmentary vertical section through the copy holder taken on the line 2—2 of Fig. 1.

Although the indicating means on the copy holder and the masking member for the film gate are both shown and described as being movable only to vary one dimension of the photographic field and exposure field, it is to be understood as within the scope of the invention and the skill of a mechanic to adapt the apparatus disclosed herein to vary two or more dimensions of the photographic and exposure fields to correspond with each other.

In the illustrated embodiment of the invention the photographic copying apparatus comprises a casing with an open front and including a copy holder as its base with the copying camera mounted on top of the casing. Said casing comprises a copy holder or hollow base member 10, a cover 11, a rear wall 12, side walls 13 and 14 and a front wall 15 which is cut away to provide an open front for the casing. Said side walls 13 and 14 are also provided with recesses or hand holes 16 so that the operator may more readily reach into the casing for insertion or removal of the documents to be copied.

The copy holder or hollow base member 10 has a top wall 17 which is provided with a recess 18 which is preferably rectangular. One edge of said recess 18 forms a stationary abutment 19 against which all documents to be copied are located.

The copying camera is mounted on the top of cover 11 and comprises a base plate 20 and a camera casing 21 having film supply and film take-up compartments. An objective assembly includes a mounting socket 22, an objective support 23 therein and carying an objective barrel 24 equipped with lenses 25. A shutter housing 26 encloses said objective asembly and a shutter 27 is adapted to be operated in a known manner so that an image of the photographic field on the copy holder may be projected into the exposure field behind the objective assembly.

The film gate in the copying camera includes a channeled plate 28 secured by bolts 29 to the objective support 23 and provided with an opening 30 having a recess 31. The film F, see Fig. 6, rides with its margins on the edges of channeled plate 28 adjoining the opening 30 therein. A masking member 32 is slidably mounted on objective support 23 within the channel of plate 28 and carries a guide block 33 attached to masking member 32 by a rivet 34. Said masking member 32 is provided with a rectangular recess 35 which is adapted to co-operate with the opening 30 and in different positions to provide various size openings in the film gate. A connecting ear 36 is turned from the stock of the masking member 32.

The film F extends from the supply film roll 37 on spindle 38 in the film supply compartment, over the top of the channeled plate 28, over a guide roller 39 to the take-up roll 40 on the spindle 41 in the take-up compartment. The pressure pad 42 has a plurality of rollers 43 for resiliently pressing the film strip F against the margins of channeled plate 28 adjacent the opening 30 therein. It will be noted from Fig. 6 that the guide block 33 is thinner than the adjacent edges of the channeled plate 28 so that guide block 33 does not make contact with the surface of the light-sensitive film strip F.

With the masking member 32 in the position shown in Figs. 1 and 5, only a comparatively small area of light-sensitive material may be exposed through the film gate and the recess 31 permits recording of standard indicia, such as machine number, date, etc. on the film. Furthermore, the forward edge of the recess 18, such as the stationary abutment 19, has its image lying along or adjacent to the fixed edge 30' of the channeled plate 28. The opposite edge 32' of the masking member 32 determines the area of film that may be exposed through the film gate and is moved automatically in a manner later to be described so as to correspond to the rear edge of the particular size document on the copy holder.

The area of the copy holder which is covered by the particular area of exposed film in the camera is defined by an indicating means which is associated with the copy holder and operatively connected to the masking arrangement just described. Said indicating means may comprise one or more guide and/or indicating members which are mounted on or over the copy holder and which may merely indicate the extent of the photographic field or, preferably, actually confine the document within such photographic field. Such indicating or guide members may be movable with respect to the copy holder for the purpose of defining or indicating thereon different sized areas which are covered by the exposure field of the camera and are preferably movable within or into the rectangular recess 18 of said copy holder.

One convenient and satisfactory form of indicating member is disclosed herein and comprises a guide strip 44 extending transversely of the recess 18 and parallel to the stationary abutment 19. This guide member 44 is attached to a carriage for movement longitudinally of the copy holder. Said carriage comprises a plate 45 carrying a plurality of grooved rollers 46 and having a pair of arms 47 extending upwardly through longitudinally parallel slots 48 provided in the top wall 17 of the copy holder and within the recess 18. The ends of guide member 44 are attached to the arms 47 by bolts 49. A mounting strip 50 is supported by brackets 51 in spaced relation to the top wall 17 of the copy holder and is located between the parallel slots 48. The grooves of rollers 46 engage the edges of mounting strip 50 and the guide member 44 is movable with said carriage longitudinally of the copy holder for defining thereon areas of different lengths.

A motion transmitting means is connected between the guide member 44 and the masking member 32 and may be provided in any convenient manner so as to transmit a definite proportion of the motion of the guide member to the masking member, which proportion will depend upon or may be calculated from the vertical distance between the photographic field of the document to be copied and the exposure field of the light-sensitive material as well as the magnification of the objective assembly or lenses 25. Said motion transmitting means preferably includes an endless driving member, a proportional connection and an adjustable connection which provide convenient arrangements for transmitting the motion of the guide member to the masking member and for adjusting the proportion and relation of the motion transmitted.

The endless driving means preferably includes, see Figs. 1 and 3, a chain 52 encircling a sprocket 53 suspended from top wall 17 of the copy holder by a bracket 54 and encircling a sprocket 55 which is mounted on one end of a shaft 56 suspended at the rear of the copy holder from top wall 17 by the bracket 57. The chain 52 is connected to the guide carriage or more specifically to the base plate 45 thereof by a stud 58. The motion transmitting means then extends upwardly through the casing of the copying apparatus preferably at one side thereof. For this purpose a chain 59 encircles a sprocket 60 on the outer end of shaft 56 and also encircles a sprocket 61 mounted in the upper portion of the casing by a shaft 62 journaled in a bracket 63 on the rear wall 12 of the casing.

The proportional connection or arrangement for transmitting only part of the movement of the guide member 44 to the masking member 32 may comprise a cam 64 mounted on said shaft 62 to turn with the sprocket 61 and engaging one end of a linkage which completes the connection to said masking member 32.

Such linkage comprises a connecting rod 65 pivotally connected at one end to the connecting ear 36 of masking member 32 and at the other end to a link 66 which has its other end pivoted on a stud 67 mounted in a lug 68 depending from the base plate 20 of the copying camera. An arm 69 is also pivoted on the stud 67 and at one end carries a follower 70 for engaging the periphery of cam 64, being held in such engagement by a spring 71 connected between arm 69 and rear wall 12, and being provided at the other end with an arcuate slot 72 concentric with stud 67 and through which extends a bolt 73 which is threaded into the link 66. The arcuate slot 72 and bolt 73 provide an adjustable connection between link 66 and arm 69 so that angular relation therebetween may be varied by loosening bolt 73, varying such angular relation, and then tightening said bolt 73.

When the guide member 44 is in the position shown in Figs. 1 and 3, it is conceivable that a careless operator may place the document to be copied in that portion of recess 18 which is behind the guide member 44 and which, therefore, is not at that time in the photographic field of the copying apparatus. In order to prevent such mislocation of the document, a covering means is provided for that area of the copy holder which is not covered by the copying camera or which is outside of the area defined by guide member 44. Such covering means or preventative arrangement may be provided in several ways but has been specifically shown as a curtain roller comprising a conventional spring roller 74 journaled in bracket 75 on said rear wall 12, a screen 76 adapted to be normally wound on roller 74, and an endpiece 77 which is connected by a hook 78 to the guide member 44. It will be obvious that as the guide member 44 is moved backwardly, the screen 76 will be wound on roller 74 and vice versa, as guide member 44 is moved forwardly, the screen will be unwound to cover the area of the rectangular recess 18 of the copy holder which is not defined by the guide member 44 or covered by the available exposure field in the copying camera.

The operation of the photographic copying apparatus, according to the invention, will now be explained. With the guide member 44 and masking member 32 in the position illustrated in Figs. 1, 3 and 5, relatively narrow documents, such as checks, may be placed in the copy holder with one edge against the stationary abutment 19 and in front of the guide member 44. The available opening in the film gate between the fixed edge 30' of the channeled plate 28 and the masking edge 32' will cover the defined area on the copy holder or the area of the document being copied. If a larger document is to be copied, it cannot be laid flat within the recess 18 of the copy holder and in front of the guide member 44 and the covering means or screen 76 will prevent its being laid on the copy holder behind the guide member 44. Consequently, the operator moves the guide member 44 rearwardly of the copy holder until there is sufficient area in front of guide member 44 to receive the document to be copied in a flat position in the recess 18.

Such rearward movement of the guide member 44 will move the carriage supporting the same rearwardly of the mounting strip 50 and will also move the upper reach of chain 52 rearwardly. As a result, sprockets 55 and 60 are rotated in a clockwise direction as viewed from Fig. 1 so that chain 59 and sprocket 61 have a corresponding movement. This clockwise rotation of cam 64 will cause arm 69 to be pivoted and connecting rod 65 to be moved toward the left as viewed from Figs. 1 and 5. As a result, the masking member 32 and the edge 32' will be moved away from the fixed edge 30' of the opening 30 to increase the opening in the film gate. Cam 64 is designed so that the proportion of the motion of guide member 44, which is transmitted to the masking member 32, will increase the area of the opening 30 in relation to the increased area for reception of a document on the copy holder. Conversely, as the guide member 44 is moved forwardly, the motion transmitting means will impart a proper proportion of such movement of the guide member 44 to the masking member 32 to reduce the area of the opening 30 in the film gate so that only an area of light-sensitive material in the exposure field is available to cover the area defined in the photographic field and occupied by a document to be copied.

It is obvious that other mechanical arrangements for transmitting a proportion of the movement of the guide member 44 to the masking member 32 may be provided. Consequently, the type of motion transmitting means disclosed herein is merely illustrative and the scope of the invention is defined by the appended claims.

Having now particularly described my invention what I desire to secure by Letters Patent of the United States and what I claim is:

1. In a photographic copying apparatus having a photographic field and an exposure position, the combination with a copy holder for supporting a document in said photographic field, and a film gate for supporting light sensitive material in said exposure position, including a plate provided with an opening and including a masking member movable to vary the area of said opening, of an indicating means associated with said copy holder and operatively connected to said masking member for defining an area on said copy holder and varying the opening in said film gate in relation to the defined area on said copy holder.

2. In a photographic copying apparatus having a photographic field and an exposure position, the combination with a copy holder for supporting a document in said photographic field, and a film gate for supporting light sensitive material in said exposure position, including a plate provided with an opening and including a masking member movable to vary the area of said opening, of an indicating member movable with respect to said copy holder and for defining an area thereon, and motion transmitting means between said masking and indicating members for transmitting movement of said indicating member to said masking member.

3. In a photographic copying apparatus having a photographic field and an exposure position, the combination with a copy holder for supporting a document in said photographic field, and a film gate for supporting light sensitive material in said exposure position, including a plate provided with an opening and including a masking member movable to vary the area of said opening, of an indicating member movable with respect to said copy holder and for defining an area thereon, and a motion transmitting means including a proportional connection for transmitting only a portion of the movement of said indicating member to said masking member.

4. In a photographic copying apparatus having a photographic field and an exposure position, the combination with a copy holder for supporting a document in said photographic field, and a film gate for supporting light sensitive material in said exposure position, including a plate provided with an opening and including a masking member movable to vary the area of said opening, of an indicating member movable with respect to said copy holder and for defining an area thereon, and a motion transmitting means including an adjustable connection for transmitting movement of said indicating member to said masking member and permitting relative adjustment of said masking member with respect to said indicating member.

5. In a photographic copying apparatus having a photographic field and an exposure position, the combination with a copy holder for supporting a document in said photographic field, and a film gate for supporting light sensitive material in said exposure position, including a plate provided with an opening and including a masking member movable to vary the area of said opening, of an indicating means associated with said copy holder and operatively connected to said masking member for defining an area on said copy holder and varying the opening in said film gate in relation to the defined area on said copy holder, and a covering means connected to and movable with said indicating means and for covering an undefined and otherwise accessible area on said copy holder.

6. In a photographic copying apparatus having a photographic field and an exposure position, the combination with a copy holder provided with a recess for receiving a document and supporting the same in said photographic field, and a film gate for supporting light sensitive material in said exposure position, including a plate provided with an opening and including a masking member movable to vary the area of said opening, of an indicating means movable within the recess of said copy holder to define an area thereof, and motion transmitting means between said indicating means and said masking member for transmitting movement of said indicating means to said masking member.

7. In a photographic copying apparatus having a photographic field and an exposure position, the combination with a copy holder for supporting a document in said photographic field and having a stationary abutment engaging one edge of the document, and a film gate for supporting light sensitive material in said exposure position, including a plate provided with an opening having a fixed edge and including a masking member movable with respect to said fixed edge to vary the area of said opening, of an indicating means movable with respect to the abutment of said copy holder to vary the area that may be occupied by a document thereon and operatively connected with said masking member to change the area of the opening in said film gate in proportion to the area of said document.

8. In a photographic copying apparatus having a photographic field and an exposure position, the combination with a copy holder for supporting a document in said photographic field and having a stationary abutment engaging one edge of the document, and a film gate for supporting a light sensitive film strip in said exposure position, including a plate provided with an opening having a fixed edge corresponding to said abutment on the copy holder and including a masking member movable longitudinally of said film strip to vary the length of said opening, of an indicating means longitudinally movable with respect to the stationary abutment of said copy holder to vary the longitudinal dimension of the area that may be occupied by a document thereon and operatively connected with said masking member to change the length of the opening in said film gate in proportion to the corresponding dimension of the document.

9. In a photographic copying apparatus having a photographic field and an exposure position, the combination with a copy holder for supporting a document in said photographic field, and a film gate for supporting light sensitive material in said exposure position, including a plate provided with an opening and including a masking member movable to vary the area of said opening, of an indicating member movable with respect to said copy holder and for defining an area thereon, and a motion transmitting means comprising a linkage connected at one end to said masking member, a cam member for actuating the other end of said linkage, and an endless drive connected between said indicating and cam members for moving said cam member and linkage to vary the opening in said film gate when the indicating member is moved with respect to said copy holder.

10. In a photographic copying apparatus having a photographic field and an exposure position, the combination with a copy holder comprising a hollow base member including a top wall having a rectangular recessed portion which is provided with a pair of spaced slots perpendicular to one edge of said recessed portion, a mounting strip within said base member between said slots, a carriage movably mounted on said strip, and a guide member above said top wall having a pair of arms extending through respective slots for connection to said carriage, and movable in parallel relation to said one edge wall of the recessed portion, of a film gate for supporting light sensitive material in said exposure position, including a space provided with an opening and including a masking member movable to vary the area of said opening, and a motion transmitting means comprising a linkage connected at one end to said masking member, a cam member adapted upon rotation to actuate the other end of said linkage, and an endless drive connected to said carriage and for rotating said cam member upon movement of said guide member and carriage to move said masking member for varying the opening in said film gate.

ROY S. HOPKINS.